(12) United States Patent
Whitmarsh et al.

(10) Patent No.: US 11,022,407 B2
(45) Date of Patent: Jun. 1, 2021

(54) UAV DEFENSE SYSTEM

(71) Applicant: Tradewinds Technology, LLC, Las Vegas, NV (US)

(72) Inventors: Peter David Whitmarsh, Las Vegas, NV (US); Shana Whitmarsh, Las Vegas, NV (US)

(73) Assignee: Tradewinds Technology, LLC, Carlsbad, CA (US)

( * ) Notice: Subject to any disclaimer, the term of this patent is extended or adjusted under 35 U.S.C. 154(b) by 210 days.

(21) Appl. No.: 16/062,102

(22) PCT Filed: Dec. 8, 2016

(86) PCT No.: PCT/US2016/065606
§ 371 (c)(1),
(2) Date: Jun. 13, 2018

(87) PCT Pub. No.: WO2017/106005
PCT Pub. Date: Jun. 22, 2017

(65) Prior Publication Data
US 2019/0003807 A1     Jan. 3, 2019

Related U.S. Application Data

(60) Provisional application No. 62/339,210, filed on May 20, 2016, provisional application No. 62/267,393, filed on Dec. 15, 2015.

(51) Int. Cl.
*F41H 11/02* (2006.01)
*G01S 5/00* (2006.01)
(Continued)

(52) U.S. Cl.
CPC ............ *F41H 11/02* (2013.01); *G01S 5/0027* (2013.01); *G01S 5/14* (2013.01); *G08G 5/006* (2013.01);
(Continued)

(58) Field of Classification Search
CPC .......... F41H 11/02; H04L 67/20; H04L 67/12; H04L 67/2819; H04L 29/06; G01S 5/14;
(Continued)

(56) References Cited

U.S. PATENT DOCUMENTS 9,085,362 B1 * 7/2015 Kilian ...................... B64F 1/02
9,087,451 B1    7/2015 Jarrell
(Continued)

OTHER PUBLICATIONS

International Search Report issued for PCT/US2016/065606, dated Feb. 17, 2017.

*Primary Examiner* — Abby Y Lin
*Assistant Examiner* — Hossam M Abd El Latif
(74) *Attorney, Agent, or Firm* — Thorpe North & Western, LLP

(57) ABSTRACT

An unmanned aerial vehicle defense system may include a sensor network having a plurality of radio receivers that are operable to detect a radio signal broadcast by the unmanned aerial vehicle. A control system operatively associated with the sensor network includes a processing system to identify the unmanned aerial vehicle detected by the sensor system. The control system also includes a countermeasures system that develops a countermeasure based on the identity of the unmanned aerial vehicle. A transmitter system operatively associated with the control system transmits the developed countermeasure to the unmanned aerial vehicle. The unmanned aerial vehicle subsequently operates in accordance with the developed countermeasure.

38 Claims, 4 Drawing Sheets

(51) Int. Cl.
*G01S 5/14* (2006.01)
*G08G 5/00* (2006.01)
*H04L 29/06* (2006.01)
*H04L 29/08* (2006.01)

(52) U.S. Cl.
CPC .......... *G08G 5/0013* (2013.01); *G08G 5/0039* (2013.01); *G08G 5/0069* (2013.01); *G08G 5/0082* (2013.01); *H04L 29/06* (2013.01); *H04L 67/12* (2013.01); *H04L 67/20* (2013.01); *H04L 67/2819* (2013.01)

(58) Field of Classification Search
CPC ...... G01S 5/0082; G01S 5/0069; G01S 5/006; G01S 5/0039; G01S 5/0013; G01S 5/0027; B60W 60/0051; B60W 60/005; B60W 60/0053; B60W 60/0061; B60W 60/007
USPC .......................................................... 701/120
See application file for complete search history.

(56) References Cited

U.S. PATENT DOCUMENTS

| | | |
|---|---|---|
| 2004/0249519 A1 | 12/2004 | Frink |
| 2008/0088508 A1* | 4/2008 | Smith .................... H01Q 21/29 342/453 |
| 2010/0085236 A1 | 4/2010 | Franceschini et al. |
| 2014/0213176 A1* | 7/2014 | Mendelson ........ G06Q 30/0261 455/39 |
| 2015/0254988 A1* | 9/2015 | Wang .................. G08G 5/0052 701/3 |
| 2015/0323930 A1* | 11/2015 | Downey ................ G08G 5/006 701/2 |
| 2015/0350914 A1 | 12/2015 | Baxley et al. |
| 2016/0245907 A1* | 8/2016 | Parker ..................... F41H 11/02 |
| 2017/0069214 A1 | 3/2017 | Dupray et al. |
| 2017/0192089 A1* | 7/2017 | Parker .................. G08G 5/0026 |
| 2018/0164080 A1 | 6/2018 | Chi-Hsueh |
| 2018/0208326 A1 | 7/2018 | Sander |
| 2019/0173605 A1* | 6/2019 | Morrow ................. H01Q 21/22 |

* cited by examiner

UAV DEFENSE SYSTEM

CROSS-REFERENCE TO RELATED APPLICATIONS

This application claims the benefit of U.S. Provisional Patent Application No. 62/267,393, filed on Dec. 15, 2015, and U.S. Provisional Patent Application No. 62/339,210, filed on May 20, 2016, both of which are hereby incorporated herein by reference for all that they disclose.

TECHNICAL FIELD

The present invention relates to defense systems in general and more particularly to systems for defending against unauthorized incursions by unmanned aerial vehicles.

BACKGROUND ART

Unmanned aerial vehicles (UAVs) or "drones" are well-known in the art and are used for a wide variety of purposes and in a wide variety of situations and environments. In recent years the use of UAVs has proliferated to the point where they can pose, either deliberately or inadvertently, a hazard to persons and things in the vicinity of the UAVs. Currently, there is no true defense against the presence of UAVs in unwanted areas, nor are there reliable detection systems with sufficient sensitivity or responsiveness to detect and defend against the unwanted presence of UAVs.

DISCLOSURE OF INVENTION

One embodiment of an unmanned aerial vehicle defense system disclosed herein may include a sensor network having a plurality of radio receivers that are operable to detect a radio signal broadcast by the unmanned aerial vehicle. A control system operatively associated with the sensor network includes a processing system to identify the unmanned aerial vehicle detected by the sensor system. The control system also includes a countermeasures system that develops a countermeasure based on the identity of the unmanned aerial vehicle. A transmitter system operatively associated with the control system transmits the developed countermeasure to the unmanned aerial vehicle. The unmanned aerial vehicle subsequently operates in accordance with the developed countermeasure.

Another embodiment of the unmanned aerial vehicle defense system may include a sensor network having a plurality of radio transceivers that are operable to detect and broadcast radio signals to and from unmanned aerial vehicles. A control system operatively associated with the sensor network includes a processing system that identifies the detected unmanned aerial vehicle based on radio signals broadcast by the unmanned aerial vehicle and detected by the sensor network. The control system may also include a countermeasures system that develops a countermeasure based on the identity of the unmanned aerial vehicle. The processing system operates the radio transceivers of the sensor network to transmit the developed countermeasure to the unmanned aerial vehicle so that the unmanned aerial vehicle subsequently operates in accordance with the developed countermeasure.

A method of defending against an unmanned aerial vehicle is also disclosed that includes the steps of: Monitoring a sensing area for the presence of the unmanned aerial vehicle; detecting a radio signal broadcast by the unmanned aerial vehicle; identifying the unmanned aerial vehicle; developing a countermeasure based on the identity of the unmanned aerial vehicle; and transmitting the developed countermeasure to the unmanned aerial vehicle, the unmanned aerial vehicle subsequently operating in accordance with the developed countermeasure.

Also disclosed is a non-transitory computer-readable storage medium having computer-executable instructions embodied thereon that, when executed by at least one computer processor cause the processor to: Monitor a sensor network to detect the presence of an unmanned aerial vehicle, the sensor network including a plurality of radio transceivers that are operable to detect and broadcast radio signals from and to the unmanned aerial vehicle; identify the unmanned aerial vehicle based on radio signals received from the unmanned aerial vehicle; develop a countermeasure based on the identity of the unmanned aerial vehicle; and transmit the developed countermeasure to the unmanned aerial vehicle so that the unmanned aerial vehicle subsequently operates in accordance with the developed countermeasure.

BRIEF DESCRIPTION OF THE DRAWINGS

Illustrative and presently preferred exemplary embodiments of the invention are shown in the drawings in which.

BEST MODE FOR CARRYING OUT THE INVENTION

Figure 1:
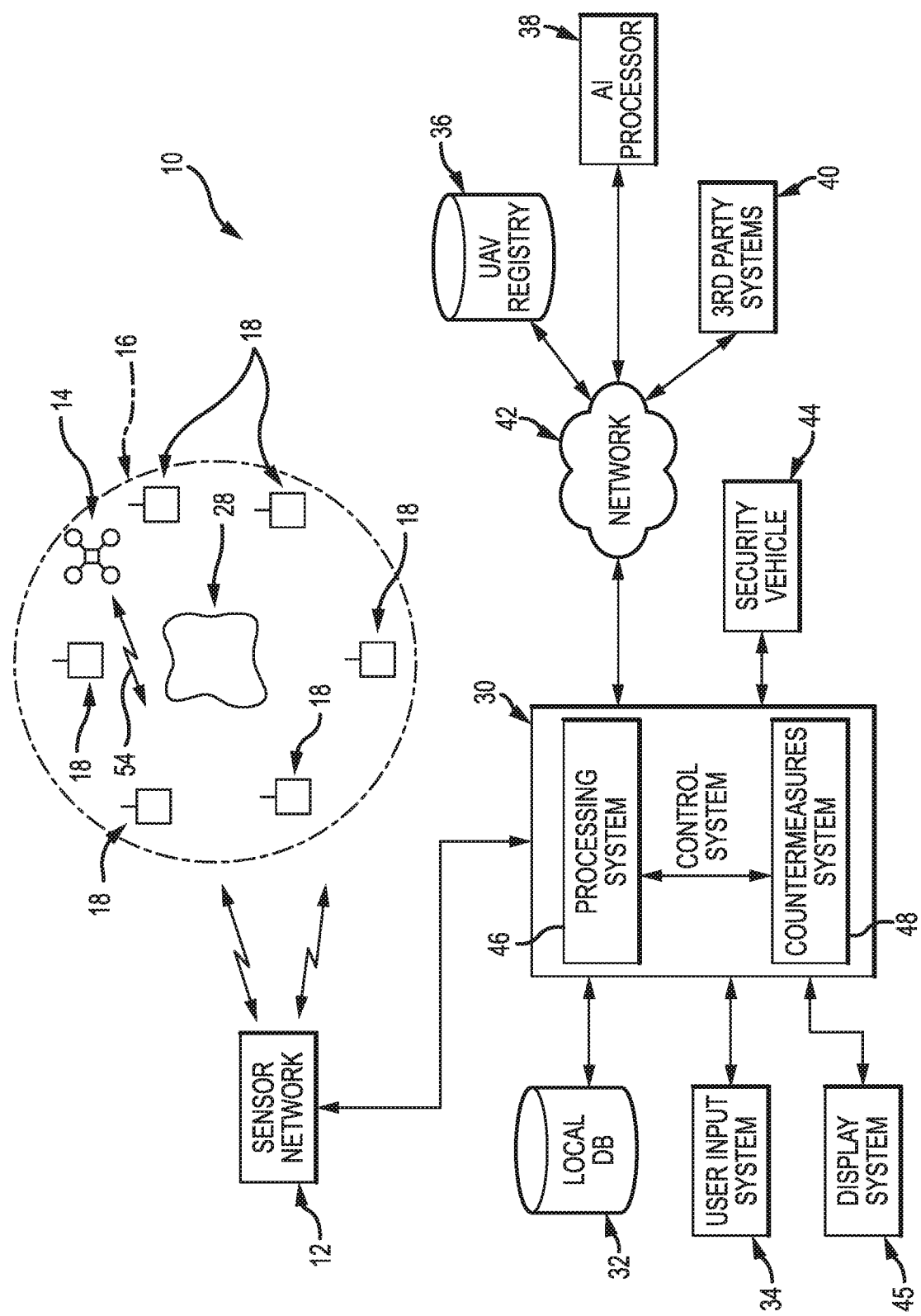
FIG. 1 is a schematic block diagram of one embodiment of a UAV defense system according to the teachings of the present invention.
Figure 2:
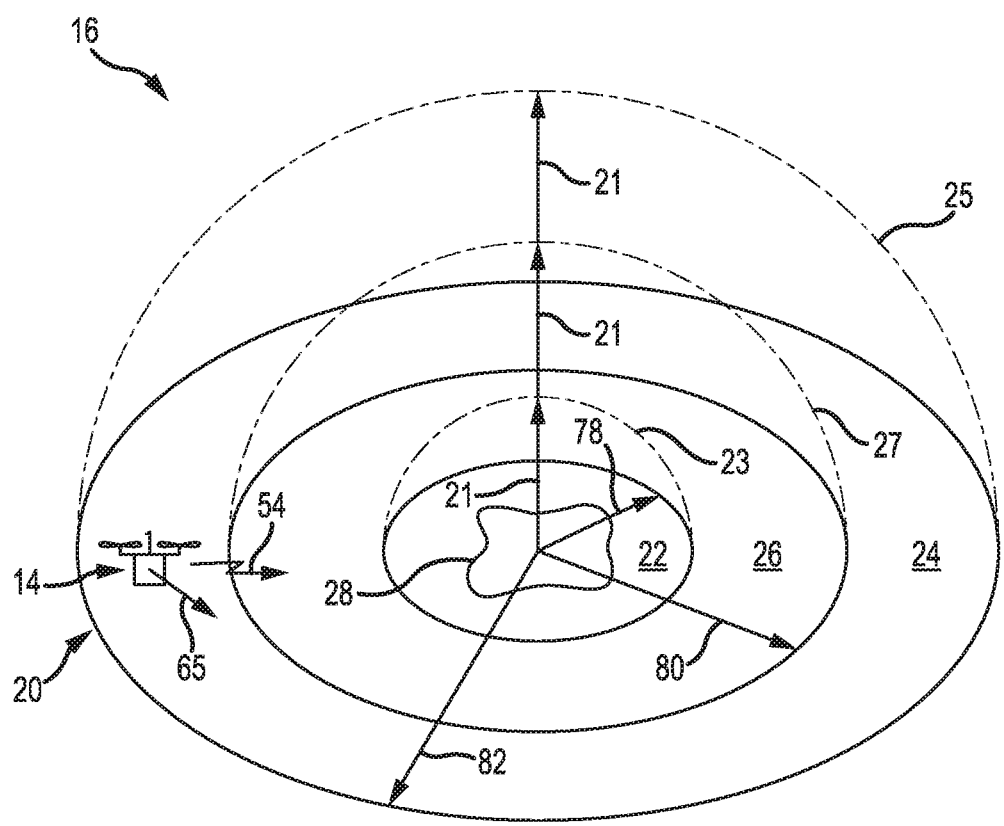
FIG. 2 is a schematic representation of one embodiment of a sensing area.

One embodiment of an unmanned aerial vehicle defense system 10 is best seen in FIGS. 1 and 2 as it could be used in a terrestrial or ground-based application in which the various components comprising the aerial vehicle defense system 10 are located on the ground. However, and as will be discussed in further detail herein, other embodiments may comprise air- or sea-based systems that are configured to defend aircraft or ships against nearby unmanned aerial vehicles. In any event, and regardless of the particular application for which the system 10 is specifically configured, the unmanned aerial vehicle defense system 10 may comprise a sensor network or array 12 for detecting or sensing the presence of one or more unmanned aerial vehicles 14 within a sensing area 16. The sensor network 12 may comprise a plurality of individual radio receivers and/or transmitters, i.e., transceivers 18 that together define the sensing area 16. In one embodiment for a ground-based application, sensing area 16 may comprise a three-dimensional region or area having a generally circular planform or 'footprint' 20, as best seen in FIG. 2. Sensing area 16 also may extend vertically upward to various altitudes (indicated by arrows 21 in FIG. 2), again depending on the particular configuration of the various radio transceivers 18 comprising sensor network 12. Alternatively, sensing area 16 may have other shapes and configurations, as will be described in further detail herein. For example, in an airborne application, the sensing area may comprise a generally spherical configuration surrounding the vehicle or area to be defended.

With reference now primarily to FIG. 2, the circular planform or footprint 20 defined by the sensing area 16 may comprise respective near, far, and intermediate detection zones 22, 24, and 26 that are centered around a primary defense point or area 28. Because sensing area 16 may also extend vertically upward, the near, far, and intermediate detection zones 22, 24, and 26 may be thought of as comprising generally hemispherically shaped regions or 'shells' 23, 25, and 27. UAVs 14 entering the various regions or shells 23, 25, and 27 of sensing area 16 may be detected by the UAV defense system 10.

UAV defense system 10 may also comprise a control system 30. Control system 30 may be operatively connected to the sensor array or network 12 as well as to various auxiliary systems and devices that may be required or desired to achieve certain functionalities or to allow the UAV defense system 10 to operate in certain environments. For example, and as will be described in much greater detail herein, such auxiliary systems and devices may comprise a local database 32, one or more user input systems or devices 34, a UAV registry database 36, a supplemental artificial intelligence (AI)-based processing system 38, and various third party systems 40. One or more of the various auxiliary systems and devices may be operatively connected to control system 30 by one or more networks 42, although the use of such networks 42 is not required. In some embodiments, the UAV defense system 10 may also comprise one or more security vehicles 44. Such a security vehicle(s) 44 may itself comprise an unmanned aerial vehicle, but under the secure control of the UAV defense system 10. Finally, control system 30 may be operatively connected to one or more display systems 45. Display system 45 may be used to present in visual form certain information and data relating to the operation of the UAV defense system 10, the relative locations of detected UAVs 14 within sensing area 16, and reports regarding defense actions taken by UAV defense system 10, just to name a few.

Control system 30 may itself comprise a processing system 46 and a countermeasures system 48. Briefly, processing system 46 receives information and data from the sensor array 12 relating to one or more UAVs 14 detected within the sensing area 16. Processing system 46 may process that information and data not only to identify the detected UAV(s) 14 but also to calculate or determine the position within the sensing area 16 of the detected UAV(s) 14. Processing system 46 may also interface with the countermeasures system 48 as well as with the detected UAV(s) 14 to implement at least certain countermeasures developed by countermeasures system 48. Finally, processing system 46 also may interface with and/or control the various auxiliary systems and devices that may be operatively associated with the control system 30.

The countermeasures system 48 is operatively connected to the processing system 46 and develops one or more countermeasures based on the identity and/or position of the detected UAV 14, although other factors may be used as well. For example, and as will be described in much greater detail below, certain countermeasure(s) developed by the countermeasures system 48 may cause the UAV defense system 10 to actually commandeer the detected UAV(s) 14 by transmitting, i.e., via processing system 46 and the various radio transceivers 18, the appropriate instructions to the detected UAV(s) 14. That is, the commandeer countermeasure will cause the detected UAV 14 to follow instructions from the UAV defense system 10 rather than from the original operator of the detected UAV 14.

Another countermeasure that may be developed and implemented by the UAV defense system 10 is a disable countermeasure. Briefly, a disable countermeasure may be used to actually disable the detected UAV 14. Such disablement may be accomplished by transmitting, again via processing system 46 and radio transceivers 18, the appropriate instructions to the detected UAV 14. By way of example, such instructions may cause the UAV control system 67 to deactivate or turn off the propulsion system 70 of the detected UAV 14. See FIG. 3. Still yet another countermeasure that may be developed and implemented by UAV defense system 10 may be an intercept countermeasure. An intercept countermeasure may be used to intercept the detected UAV 14 in mid-flight. In some embodiments, the UAV defense system 10 may dispatch one or more security vehicles 44 and operate it so that it actually collides with the detected UAV 14. Alternatively, other interception techniques are possible and may be used.

Figure 3:
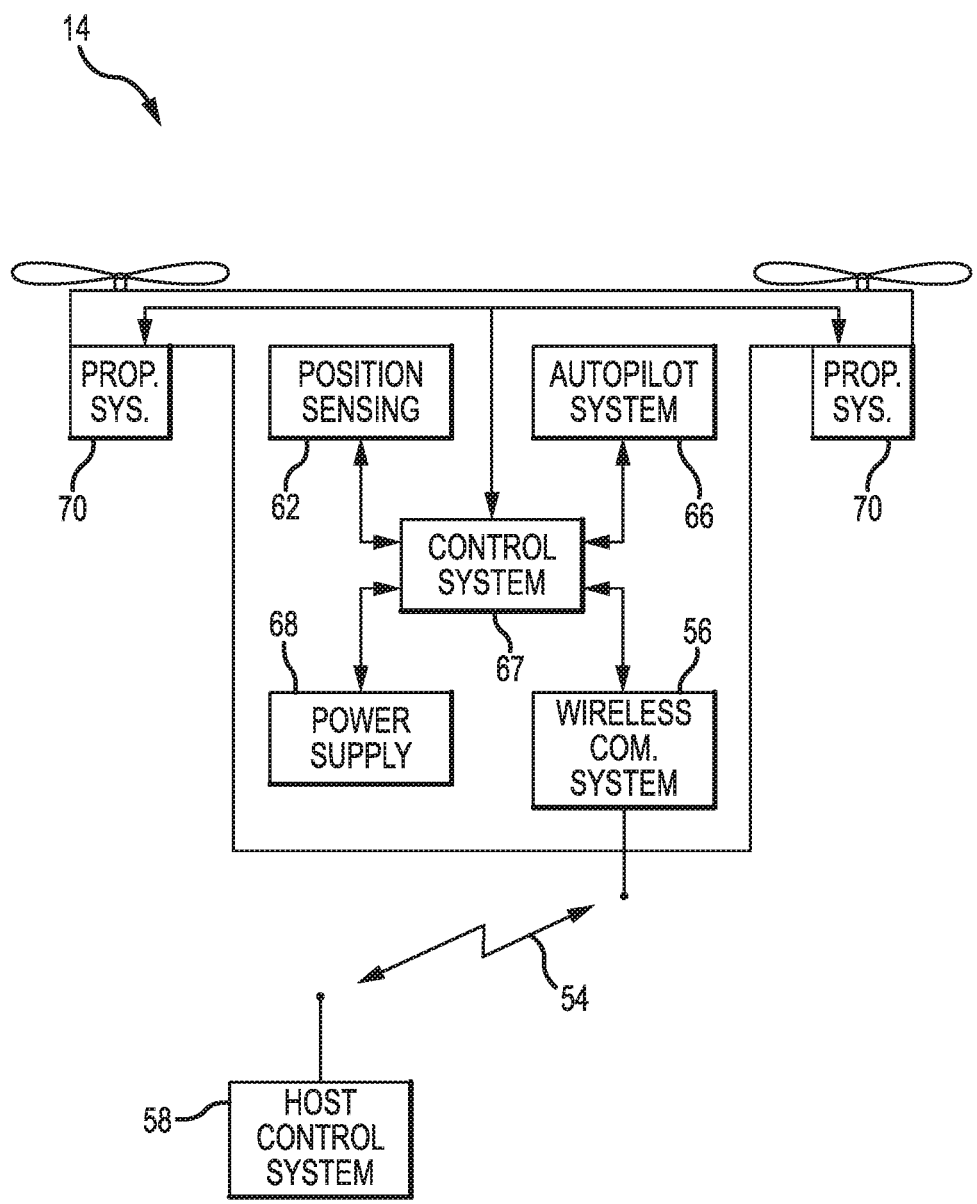
FIG. 3 is a schematic block diagram of the various systems of a typical UAV.
Figure 4:
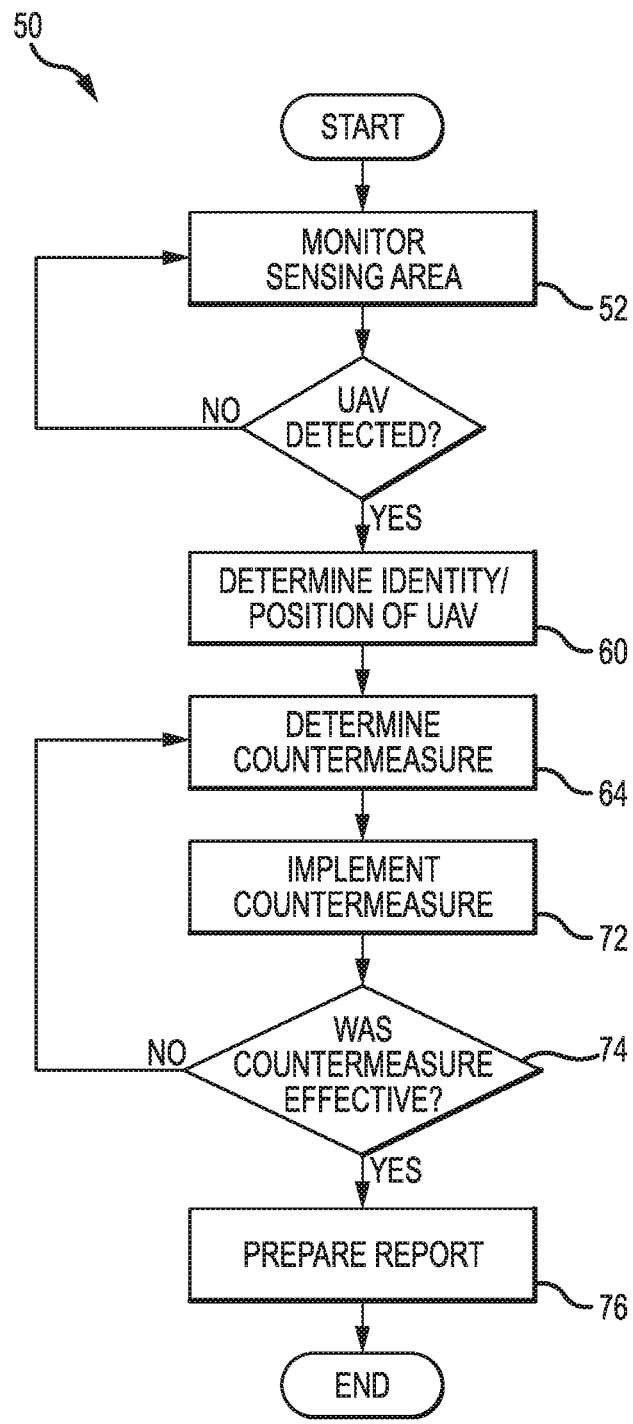
FIG. 4 is a flow chart of one embodiment of a method of defending against one or more UAVs.

Referring now primarily to FIG. 4, but with occasional reference to FIGS. 1-3, the UAV control system 10 may be operated in conjunction with a method 50 to defend against one or more unmanned aerial vehicles 14. A first step 52 of method 50 may involve monitoring the sensing area 16 for the presence of one or more UAVs 14. Such monitoring may involve using the various radios 18 comprising the sensor network 12 to detect radio signals 54 transmitted by the UAV(s) 14.

Briefly, and with reference now primarily to FIG. 3, commercially produced UAVs 14 are provided with one or more wireless communication system(s) 56 that periodically broadcast radio signals 54. The radio signals 54 allow the UAV 14 to communicate with a host control system 58 controlled by the operator (not shown) of the UAV 14. The information that is periodically broadcast by the wireless communication system(s) 56 of UAV 14 typically includes at least a beacon frame which contains certain information and data about the UAV 14, including its media access control address or MAC address. Of course, additional information may be broadcast as well.

The various radios 18 comprising the sensor network 12 detect the radio signals 54 (e.g., the beacon frame) periodically broadcast by the UAV(s) 14. From those detected radio signals, the UAV defense system 10 is able to identify the UAV 14 at step 60. Optionally, and also at step 60, the UAV defense system 10 may also determine the position within the sensing area 16 of the detected UAV 14. As will be described in further detail herein, the position of the detected UAV 14 may be determined by any of a wide range of techniques, including techniques that involve a measurement of the signal strength of the radio signals 54, a determination of the time-of-flight of the radio signals 54 to the various radios 18, and by triangulation. In addition, if the UAV 14 is provided with its own position sensing system 62, e.g., an inertial-based system or a satellite-based system, such as GPS, then the UAV defense system 10 may determine the position of the UAV by accessing the position sensing system of the detected UAV 14 via the wireless communication system 56.

In any event, once the identity and/or position of the detected UAV 14 has been determined (e.g., in step 60), method 50 may proceed to step 64 in which the countermeasures system 48 develops an appropriate countermeasure for the detected UAV 14. As will be described in greater detail below, suitable countermeasures may be developed based on a wide range of factors, including, but not limited to, the identity of the detected UAV 14, its state vector 65 (FIG. 2), including the position, velocity, and acceleration of the detected UAV 14, as well the nature of the particular asset or environment being defended by the UAV defense system 10.

As briefly mentioned above, one countermeasure may comprise commandeering the detected UAV 14. Such a commandeering countermeasure will cause the detected UAV 14 to follow commands issued by the UAV defense system 10 rather than those issued by the host control system 58. In many embodiments, such a commandeer countermeasure may comprise transmitting a signal to the detected UAV 14 that instructs or commands the internal autopilot system 66 of the UAV 14 to implement a 'return to start point' routine. Such a 'return to start point' routine is typically provided in the autopilot systems 66 of most commercially available UAVs 14. The implementation or activation of such a routine by the UAV defense system 10 will cause the detected UAV 14 to return to its starting point, again without regard to any subsequent commands that may be issued by the host control system 58 of detected UAV 14.

Another countermeasure that may be appropriate in certain instances will be the disable countermeasure. The disable countermeasure issued by the UAV defense system 10 may be used to disable the detected UAV 14. For example, such a disable countermeasure may be implemented by instructing the control system 67 of the detected UAV 14 to deactivate or logically disconnect the power source 68 from the propulsion system 70. Still yet another countermeasure that may be applied by the UAV defense system 10 would be to intercept the detected UAV 14 in mid-flight, e.g., by means of the security vehicle 44.

Once the appropriate countermeasure has been developed, it may then be implemented at step 72. The processing system 46 may implement the developed countermeasure by causing the various radio transceivers 18 comprising the sensor network 12 to transmit the appropriate commands to the detected UAV 14 via wireless communication system 56. As will be described in further detail below, this may be accomplished by means of a transparent bridge, which allows the UAV defense system 10 to be recognized by the detected UAV 14 as an authorized control source. Thereafter, method 50 may proceed to step 74 in which the UAV defense system 10 continues to monitor and/or track the detected UAV 14 to ensure that the countermeasure has been implemented and the detected UAV 14 has cleared the sensing area 16 or otherwise been made inert. If for some reason the countermeasure was not effective, then method 50 may return to step 64 to develop a second countermeasure. The second countermeasure may then be implemented at step 72. Thereafter, the method 50 may provide a suitable report on the defense operation at step 76.

A significant advantage of the UAV defense system 10 is that is provides a robust defense against the presence of UAVs 14 in unwanted areas. First, the UAV defense system 10 is able to identify the UAVs 14 by passive means, i.e., by simply detecting radio signals 54 that are periodically broadcast by the UAVs 14. No active means of detection, such as radar systems, are required. Second, the information broadcast by the UAVs 14 not only allows the UAV defense system 10 to detect them, but also allows the UAV defense system 10 to identify and control the detected UAVs 14. For example, by capturing the MAC address, which is unique to each UAV 14, the UAV defense system 10 will be able to specifically identify the detected UAV 14. The UAV defense system 10 may also use the detected MAC address to rapidly ascertain other details about the detected UAV 14, including information about the particular type of UAV and the various control systems that may be utilized thereby. Detection of the MAC address also allows the UAV defense system 10 to assume control of the UAV 14 by 'posing' as an authorized control system.

Still other advantages are associated with the countermeasures system 48. For example, the countermeasures system 48 may be configured to develop countermeasures that more closely match the potential threat of the detected UAV to the nature of the asset or assets to be protected. In many instances, an effective countermeasure will be for the UAV defense system 10 to activate or invoke the 'return to start point' routine in the autopilot system 66 of the detected UAV 14. Activation of the return to start point routine will simply cause the detected UAV 14 to automatically return to its point of origin. Such a countermeasure will be particularly favored to defend against unintentional incursions by hobbyists and recreational users of UAVs. However, more robust countermeasures may be employed in other circumstances and may ultimately involve the immediate interception of the unauthorized UAV 14.

Still yet other advantages are associated with the various ancillary systems and devices that may be utilized in conjunction with the UAV defense system 10. For example, the system 10 may be configured to interface with a UAV registry database 36 to allow the UAV defense system 10 to obtain additional information about the detected UAV 14. For example, such a UAV registry database 36 may correlate the unique MAC addresses of UAV systems with information relating to the identity of the persons or entities that acquired the UAV 14. Of course, such a registry database 36 may be provided with a wide range of additional information. Moreover, the UAV defense system 10 may also be configured to update such a UAV database 36 with information and data relating to prior detection and countermeasures activities, thereby allowing troublesome or suspect UAVs 14 to be identified so that appropriate action can be taken.

In some embodiments, the AI-based processing system 38 may be used to advantage to rapidly assess the potential threat posed by the identified UAV 14. AI-based processing system 38 also may be used to develop suitable countermeasures, although such use is not required. The AI based processing system 38 also may be used to develop methods to allow the control system 30 to overcome any security measures that may prevent the control system 30 from taking control of the UAV 14. Such information could not only be used for the detected UAV 14, but for future detection as well, thereby allowing the UAV defense system 10 to adapt to counter-countermeasures that may be developed by hostile UAV operators.

Still yet other advantages are associated with the tiered detection areas or zones that may be designated by the UAV defense system 10. The tiered detection zones may be used to develop countermeasures that are appropriate or custom-tailored for the particular application, UAV, and asset to be protected by UAV defense system 10. For example, in some embodiments UAVs located in the far detection zone 24 simply may be monitored and tracked by the UAV defense system 10 but not subject to any countermeasures. UAVs 14 located in the intermediate detection zone 26 may be more carefully scrutinized and limited countermeasures applied. UAVs 14 located in the near detection zone 24 may be treated as more immediate threats and the appropriate countermeasures taken immediately. Such countermeasures may include the actual disablement of the UAV and/or its interception, again depending on a variety of factors.

Having briefly described one embodiment of the UAV defense system 10, as well as some of its more significant features and advantages, various embodiments of the UAV defense system will now be described in detail. However, before proceeding with the description it should be noted that the UAV defense system 10 may be utilized in a wide variety of environments to defend a wide range of assets, some of which are discussed herein and others of which will become apparent to persons having ordinary skill in the art after having become familiar with the teachings provided herein. Still further, several different types of network and distributed processing system architectures are known in the art that would permit a wide range of system architectures and networking structures and configurations to be used to achieve the various functionalities and objectives described herein. Again, while some such variations and alternatives are described herein, other variations and alternatives would be possible, again as would become apparent to persons having ordinary skill in the art. Consequently, the present invention should not be regarded as limited to the particular applications, environments, protected assets, system and network architectures shown and described herein.

Referring back now to FIGS. 1-3, one embodiment of the UAV defense system 10 is shown and described herein as it may be used in a ground-based application to protect or defend one or more assets located nearby or within a primary defense point or region 28. In this regard it should be noted that the primary defense point or region 28 typically will not comprise a point at all, but rather may comprise some area or region suitable for protecting an asset or assets that are to be protected against incursions by unauthorized UAVs. For example, in some embodiments the asset to be protected may comprise public or private structures, such as sports complexes, arenas, playing fields, and the like. In such instances, the primary defense point 28 will comprise some area or region surrounding or encompassing the asset. In still other embodiments, the asset to be protected may comprise any of a wide range of ground vehicles, ships, and aircraft, just to name a few. In such embodiments, the primary defense point or region 28 may be regarded as comprising the particular vehicle to be protected, rather than an area or region that surrounds the vehicle. Consequently, the terms 'defense point' or 'defense region' as used herein should be regarded as including any area, structure, or vehicle that is to be protected by the UAV defense system 10.

Regardless of the particular application and/or nature of the asset to be protected, the UAV defense system 10 may comprise a sensor network or array 12 that defines a sensing area 16 that encompasses the primary defense region 28. The sensor network or array 12 may be used to detect the presence of one or more UAVs 14 within sensing area 16. As mentioned earlier, the overall shape and configuration of the sensing area 16 may be defined in part by a plurality of individual radio transceivers 18 comprising the sensor network 12. In a typical configuration, sensing area 16 may comprise a three-dimensional area or region having a generally circular planform or footprint 20, as best seen in FIG. 2. The sensing area 16 may extend vertically upward to various altitudes, as indicated by arrows 21.

As briefly mentioned earlier, the circular footprint 20 of sensing area 16 may be divided into respective near, far, and intermediate detection zones 22, 24, and 26 that surround the primary defense point or region 28. Further, because the sensing area 16 extends vertically upward, i.e., in the direction indicated by arrows 21, the near, far, and intermediate detection zones 22, 24, and 26 may be regarded as comprising generally hemispherically shaped regions or shells 23, 25, and 27.

The sizes of the various detection zones may vary depending on a wide variety of factors, including the desired overall size of the sensing area 16, the topography within the sensing area 16, the presence of large structures or buildings, the types of radios 18 and antenna systems used, the nature of the primary defense point 28 that is to be protected, the nature of the expected UAV threat, and the particular countermeasures that are expected to be used. Consequently, the overall size of the sensing area 16, as well as the number, sizes, and configurations of the respective near, far, and intermediate detection zones 22, 24, and 26 should not be regarded as limited to any particular values. However, by way of example, in one embodiment, the near detection zone 22 may comprise a circular region having a radius 78 of about 1.6 km (about 1 mile). The far detection zone 24 may comprise an annular region having an inner radius 80 of about 8 km (about 5 miles) and an outer radius 82 of about 16 km (about 10 miles). The intermediate detection zone 26 may also comprise an annular region located between the near and far detection zones 22 and 24, as best seen in FIG. 2.

The height or altitude 21 of the sensing area 16 also may vary depending on a wide variety of factors, thus should not be regarded as limited to any particular altitude or altitudes 21. However, by way of example, in one embodiment, the altitude of the sensing area 16 may range from about 300 m to about 3,000 m (about 1,000 ft. to about 10,000 ft.) above ground level. Alternatively, other embodiments may involve different altitudes.

As briefly mentioned above, the overall size and configuration of the sensing area 16 is defined to a large extent by the number, types, and placement of the various radio transceivers 18 comprising the sensor network 12 as well as on the particular application or environment. For example, in a land-based application, such as that illustrated in FIG. 2, the sensing area 16 may comprise a generally hemispherically shaped region or regions already described. However, in an air-based application, the sensing area may comprise a generally spherically-shaped region around the aircraft or region to be defended. The sensing area may comprise still yet other configurations in a sea-based application. Therefore, the sensing area 16 for any particular embodiment or application (e.g., land-, air-, or sea-based) of the UAV defense system 10 may be changed or altered by changing the number, types, and placement of the various radios 18, as would become apparent to persons having ordinary skill in the art after having become familiar with the teachings provided herein. Consequently, the present invention should not be limited to any particular number, type, or placement of the various radio transceivers 18.

The sensor network 12 and the various radios 18 comprising the sensor network 12 may comprise any of a wide range of systems and devices now known in the art or that may be developed in the future that are (or would be) suitable for detecting radio signals produced by UAVs 14 and for producing radio signals that can be received by the UAVs 14. Consequently, the present invention should not be regarded as limited to any particular devices and systems. However, by way of example, in one embodiment, the sensor network 12 may comprise a wireless sensor network commercially available from Libelium Comunicaciones Distribuidas S.L. under the tradename "Waspmote."

Briefly, the Waspmote system is an array of radio sensors or nodes that may be connected together to form an ad-hoc wireless network. The radio sensor nodes of the Waspmote system are currently provided with radio technologies that provide for long, medium, and short range detection of various wireless communication protocols. The long range wireless communication protocols include 4G, 3G, GPRS, GPRS+GPS, LoRaWAN, LoRa, Sigfox, 868 MHZ, and 900 MHZ. Supported medium range protocols include ZigBee, 802.15.4, DigiMesh, and WiFi. Short range wireless protocols include RFID, NFC, Bluetooth 2.1, and BLE. Alternatively, of course other radios capable of receiving and broadcasting radio signals in accordance with other types of wireless communication protocols that are now known in the art or that may be developed in the future may be used as well. Consequently, the present invention should not be regarded as limited to the particular type of radio transceivers and communication protocols specified herein.

The UAV defense system may also comprise control system 30. Control system 30 may be operatively connected to the sensor array or network 12 so that control system 30 receives information and data from the sensor network 12 relating to UAVs 14 detected in the sensing area 16. In some embodiments control system 30 also may be operatively connected to various auxiliary systems and devices that may be required or desired to achieve certain functionalities or to allow the UAV defense system 10 to operate in certain environments, as described above. By way of example, such auxiliary systems and devices may include, but are not limited to, a local database 32, one or more user input devices or systems 34, a UAV registry database 36, a supplemental artificial intelligence (AI)-based processing system 38, and various third party systems 40. One or more of the various auxiliary systems and devices may be operatively connected to control system 30 by one or more networks 42. Control system 30 also may be used to control one or more security vehicles 44 if the UAV defense system 10 is provided with such security vehicles 44.

Control system 30 may be operatively connected to one or more display systems 45. Such display systems 45 may be used to present in visual form certain information and data relating to the operation of the UAV defense system 10. For example, in some embodiments the UAV defense system 10 may be programmed or configured to display on display system 45 a graphical representation of the sensing area 16. Any detected UAVs 14 also may be shown on the display system 45 to inform a system operator (not shown) of the detection of the UAV 14, its identification (e.g., based on the detected MAC address) and location within the sensing area 16 (if the location of the UAV 14 has been determined). The system 10 may also display the nature of the developed countermeasure being applied and whether that countermeasure was successful. In addition, information regarding the actual or suggested notification of any third party systems 40, such as law enforcement agencies, may be provided on display system 45.

Control system 30 itself may comprise a processing system 46 and a countermeasures system 48. Processing system 46 receives information and data from the sensor array 12 relating to one or more UAVs 14 detected within the sensing area 16. Processing system 46 may process that information and data not only to identify the detected UAV(s) 14 (e.g., based on the detected MAC address) but also to calculate or determine the position within the sensing area 16 of the detected UAV(s) 14. Processing system 46 also may communicate directly with the detected UAVs 14 to implement the various countermeasures. Finally, processing system 46 also may interface with and/or control various auxiliary systems and devices that may be operatively associated with the control system 30. The countermeasures system 48 is operatively connected to the processing system 46 and develops one or more countermeasures based on the identity and/or position of the detected UAV 14, as briefly described earlier.

In one embodiment, the processing system 46 and countermeasures system 48 of control system 30 may be implemented on one or more a general purpose programmable computer(s) programmed with executable instructions that, when executed, cause the computer(s) to perform the various steps and operations described herein for control system 30. Moreover, it should be noted that the functions and operations of control system 30 could be implemented in accordance with a variety of system and/or network architectures or configurations that are either now known in the art or that may be developed in the future that are, or would be suitable for performing the functions and operations desired or required for any particular embodiment, as would become apparent to persons having ordinary skill in the art after having become familiar with the teachings provided herein. Therefore, the particular system architectures, hardware, and software components that may be utilized in conjunction with the present invention will not be described in further detail herein.

As mentioned earlier, control system 30 may be operatively connected to various auxiliary systems and devices that may be required or desired to realize certain functionalities or to allow the UAV defense system 10 to operate in certain environments. One such auxiliary system may comprise a local database 32. Local database 32 may comprise information and data relating to the particular environment in which the UAV defense system 10 is to be used, as well as information and data relating to the primary defense region 28 and asset to be protected. Local database 32 may also be used to store information and data relating to the operation of the UAV defense system 10 for subsequent analysis, troubleshooting, or system diagnostics.

Control system 30 may also be connected to one or more user input devices or systems 34, such as one or more keyboards, pointing devices, or joysticks. The type and nature of such user input devices or systems 34 will, of course, depend on a wide variety of factors, such as the particular devices, environments, and missions for which the UAV defense system 10 is to be used. Consequently, the present invention should not be regarded as limited to use with any particular type of user input device 34.

The UAV defense system 10 may also comprise a UAV registry database 36 which may be operatively connected to control system 30. The UAV registry database 36 may include information and data related to the nature and type of UAV 14 produced by the manufacturer, the owner of the UAV, and other information. For example, the UAV registry database 36 may contain the MAC address of the UAVs which may be used to identify the manufacturer, production date, and type of UAV 14. The registry database 36 may also contain information about the UAV and/or the owner or registration which information may be used by the UAV defense system 10, e.g., to develop appropriate countermeasures.

Control system 30 may also be connected to supplemental AI (artificial intelligence)-based processing system 38. In certain instances, the supplemental AI-based processing system 38 may be used to develop suitable countermeasures and/or communication codes and/or password protocols that may be required or desired to provide rapid access to the control system 67 of the detected UAV 14, such as may be required if the control system 67 of UAV 14 is provided with security measures to prevent unauthorized systems from gaining access to the UAV control system 67.

Control system 30 also may be configured to interface with one or more third party systems 40. Such third party systems could comprise local, federal, and/or law enforcement agencies to alert such entities about the detected UAV 14 and/or the unauthorized incursion by the detected UAV 14. Appropriate action then may be taken and/or the incursion event reported.

As briefly described above, processing system 46 is configured to receive information and data from the sensor array 12 relating to UAVs 14 detected with in the sensing area 16. Processing system 46 may use that information in conjunction with information provided in local database 32 and/or UAV identification registry 36 to identify the particular UAV 14. Processing system 46 may also use the information from sensor array 12 to analyze the nature of the threat posed by the detected UAV 14 and other factors. Processing system 46 may also be used to transmit the developed countermeasure to the detected UAV 14 and ensure that the UAV 14 implements the developed countermeasure.

With reference now primarily to FIG. 3, UAVs 14 comprise a number of systems and devices required for operation. Such systems and devices may include, for example, a wireless communication system 56, a position sensing system 62, an autopilot/stability control system 66, a power supply 68, and a propulsion system 70. The function and operation of these systems is typically controlled by a control system 67. The system architecture is such that most UAVs 14 may be regarded as a network node that may be connected to at least one other node, such as a UAV control system 58, which allows a user (not shown) to control the UAV 14. Such control is accomplished by means of the wireless communication system 66 that implements standard wireless protocols to allow the radio signals 54 to carry information and data between the UAV control system 58 and the UAV 14.

The wireless communication protocols used by such UAVs 14 involve the periodic transmission of information and data (e.g., via a beacon frame) that announces the presence of the UAV 14 to other wireless communications systems within range. While the wireless protocols may comprise any of a wide variety of short, intermediate, and long range wireless communication protocols, the information and data broadcast by the UAV 14 typically includes at least the media access control (MAC) address of the UAV 14, although other information and data may be transmitted as well, as may be consistent with the particular wireless communication protocol. In one embodiment, the sensor network 12 captures the MAC address broadcast by a UAV 14 within sensing area 16. That MAC address is then used by processing system 46, optionally in conjunction with information provided in local database 32 and/or UAV registry database 36 to identify the detected UAV 14.

In addition to determining the identity of the detected UAV 14, processing system 46 may also determine the position within the sensing area 16 of the detected UAV 14. The position of the UAV 14 may be determined in accordance with any of a wide variety of techniques that are known in the art or that may be developed in the future that are or would be suitable for the particular application, environment, and wireless communication protocols. Example known techniques include, but are not limited to, techniques that involve the determination of the time-of-flight required for the radio signals 54 emitted by the detected UAV to reach the various receivers 18 comprising the sensor network 12. Triangulation methods may then be used to determine the position of the detected UAV 14. An alternative position sensing technique may be based on the strength of the radio signals 54 received by the various receivers 18. Again, triangulation methods may then be used to determine the position within the sensing area 16 of UAV 14. Still further, if the UAV 14 is provided with an on-board position sensing system 62, such as an inertial-based system or a satellite-based system, such as GPS or GLONASS, then the processing system 48 may determine the position of the UAV 14 by accessing the on-board position sensing system 62, e.g., via wireless communication system 56. However, since positioning sensing techniques are well-known in the art and could be readily provided by persons having ordinary skill in the art after having become familiar with the teachings provided herein, the particular position sensing system utilized in one embodiment of the present invention will not be described in further detail herein.

The countermeasures system 48 develops one or more countermeasures based on the identity and/or position of the detected UAV 14. For example, the countermeasure(s) developed by the countermeasures system 48 may cause the UAV defense system 10 to commandeer or assume control of the detected UAV(s) 14 by transmitting, i.e., via processing system 46 and the various radio transceivers 18, the appropriate instructions to the detected UAV(s) 14. The commandeer countermeasure will cause the detected UAV 14 to follow instructions from the UAV defense system 10 rather than from the original operator of the detected UAV 14.

Another countermeasure that may be developed and implemented by the UAV defense system 10 is a disable countermeasure which may be used to actually disable the detected UAV 14. Such disablement may be accomplished by transmitting, again via processing system 46 and radio transceivers 18, the appropriate instructions to the detected UAV 14. Such instructions may cause the UAV control system 67 to deactivate or turn off the propulsion system 70 of the detected UAV 14.

The various developed countermeasures that require access to and/or control of the UAV 14 may be accomplished via processing system 46 once the MAC address has been detected. In one embodiment, processing system 46 uses the MAC address to develop a transparent bridge. Basically, the transparent bridge allows the processing system 48 to take control of the control system 67 of UAV 14, thereby allowing processing system 46 to implement the developed countermeasure. A filtering process may be used to isolate intra-segment traffic (e.g., from other wireless devices that may be within sensing area 16), to eliminate from consideration non-UAV devices. The filtering process used by processing system 48 improves the masked network response times. However, since techniques for gaining access to control systems via a MAC address and transparent bridges are well-known in the art and could be readily developed by persons having ordinary skill in the art after having become familiar with the teachings provided herein, the particular process and techniques that may be utilized in one particular embodiment will not be described in further detail herein.

Besides the countermeasures that may require access to the UAV control system 67 to implement, UAV defense system 10 may also apply an intercept countermeasure in which the detected UAV 14 is intercepted in mid-flight. In one embodiment, the UAV defense system 10 may dispatch one or more security vehicles 44 and operate it so that it actually collides with the detected UAV 14. Such an intercept countermeasure may be used as a secondary countermeasure (e.g., if a primary countermeasure failed), or if the processing system 46 is unable to take control of the UAV 14.

The UAV control system 10 may be operated in conjunction with a method 50 to defend against one or more unmanned aerial vehicles 14. With reference now primarily to FIG. 4, a first step 52 in method 50 may involve monitoring the sensing area 16 for the presence of one or more UAVs 14. Such monitoring may involve using the various radios 18 comprising the sensor network 12 to detect radio signals 54 periodically broadcast or transmitted by the wireless communication system 56 of UAV(s) 14. As already mentioned, the information that is periodically broadcast by the wireless communication system 56 of UAV 14 typically includes at least a beacon frame which contains certain information and data about the UAV 14, including its MAC address. The various radios 18 comprising the sensor network 12 detect the radio signals 54 and are thereby able to ascertain the MAC address of the detected UAV 14. UAV defense system 10 is therefore able to identify the UAV 14 at step 60. Optionally, and also at step 60, the UAV defense system 10 may also determine the position within the sensing area 16 of the detected UAV 14. The position of the detected UAV 14 may be determined by any of a wide range of techniques, including techniques that involve determination of the time-of-flight and/or the strength of the radio signals 54 received by the various radios 18 comprising sensor network 12. Additionally, if the UAV 14 is provided with its own position sensing system 62, e.g., an inertial-based system or a satellite-based system, then the UAV defense system 10 may determine the position of the UAV by accessing the position sensing system of the detected UAV 14.

Once the identity and/or position of the detected UAV 14 has been determined in step 60, method 50 may proceed to step 64 in which the countermeasures system 48 develops an appropriate countermeasure for the detected and identified UAV 14. Suitable countermeasures may be developed based on a wide range of factors, including, but not limited to, the identity of the detected UAV 14, its state vector 65 (FIG. 2), i.e., the position, velocity, and acceleration of the UAV 14, as well the nature of the particular asset or environment being defended by the UAV defense system 10.

One countermeasure may comprise actually taking over control of or commandeering the detected UAV 14. Such a commandeering countermeasure may be implemented by processing system 46 and will cause the detected UAV 14 to follow commands issued by processing system 46 rather than those issued by the host control system 58 (FIG. 3). In many embodiments, the commandeer countermeasure may comprise activating the internal autopilot system 66 of the UAV 14 to implement a 'return to start point' routine. Activation of such a routine by the UAV defense system 10 will cause the detected UAV 14 to return to its starting point without regard to any subsequent commands that may be issued by the host control system 58 of detected UAV 14.

Another countermeasure that may be appropriate in certain instances is the disable countermeasure. As mentioned earlier, the disable countermeasure may be implemented by the processing system 46 via the transparent bridge to disable the detected UAV 14. For example, processing system 46 may instruct the control system 67 of the detected UAV 14 to deactivate or disconnect the power source 68 from the propulsion system 70.

Certain embodiments of the UAV defense system 10 may also be provided with one or more security vehicles 44. If so provided, such security vehicles 44 may be used to implement an intercept countermeasure in which the security vehicle 44 is instructed by control system 30 to intercept the detected UAV 14 in mid-flight, such as by colliding with the UAV 14. Such an intercept countermeasure may be used if previous countermeasures failed or if the detected UAV 14 is determined to pose an immediate threat to the primary defense point 28.

Once the appropriate countermeasure has been developed, it may then be implemented at step 72. The processing system 46 may implement the developed countermeasure by causing the various radio transceivers 18 comprising the sensor network 12 to transmit the appropriate commands to the detected UAV 14. Thereafter, method 50 may proceed to step 74 in which the UAV defense system 10 continues to monitor and/or track the detected UAV 14 to ensure that the countermeasure has been implemented and the detected UAV 14 has cleared the sensing area 16 or has been otherwise neutralized. If for some reason the countermeasure was not effective, then method 50 may return to step 64 to develop a second countermeasure. The second countermeasure may then be implemented at step 72. Thereafter, the method 50 may provide a suitable report on the defense operation at step 76. The report may be presented on display system 45 in the manner already described.

As mentioned earlier, the UAV defense system 10 may be configured for use in various environments to defend various types for primary defense points, vehicles, or areas 28. For example, in another embodiment the UAV system 10 may be configured to placed on aircraft to protect such aircraft against UAVs. In such an embodiment, the various radios 18 comprising the sensing network 12 may be mounted on the aircraft itself. The radios 18 will then be able to detect the presence of UAVs within a region surrounding the aircraft. The airborne UAV defense system 10 may then apply various countermeasures to clear a zone around the aircraft. Sea-based applications of the UAV defense systems would have a similar configuration, except that the various radios 18 comprising the sensing network would be positioned at various locations on the ship or vessel. Any UAVs 14 detected by the sensor network 12 could then be neutralized by applying the appropriate countermeasures.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:
1. An unmanned aerial vehicle defense system, comprising:
   a sensor network, said sensor network comprising a plurality of radio receivers, each of the radio receivers being operable to detect an unmanned aerial vehicle by detecting a radio signal broadcast by the detected unmanned aerial vehicle, the plurality of radio receivers being remote from the detected unmanned aerial vehicle;
   a control system operatively associated with said sensor network, said control system comprising:
      an artificially intelligent processing system, said artificially intelligent processing system identifying the detected unmanned aerial vehicle; and
      a countermeasures system operatively associated with said artificially intelligent processing system, said countermeasures system developing a countermeasure based on the identity of the detected unmanned aerial vehicle; and a transmitter system operatively associated with said control system, said transmitter system transmitting the developed countermeasure to the detected unmanned aerial vehicle to commandeer a host control system of the detected unmanned aerial vehicle, the detected unmanned aerial vehicle subsequently operating in accordance with the developed countermeasure without regard to a subsequent command issued by the host control system of the detected unmanned aerial vehicle.

2. The system of claim 1, wherein said sensor system comprises a plurality of radio transceivers, and wherein said transmitter system comprises the radio transceivers of said sensor system.

3. The system of claim 2, wherein said sensor system defines a sensing area and wherein said artificially intelligent processing system determines a position of the detected unmanned aerial vehicle within the sensing area.

4. The system of claim 3, wherein the sensing area defined by said sensor system comprises a far detection zone, a near detection zone, and an intermediate detection zone.

5. The system of claim 4, wherein the far, near, and intermediate detection zones define a generally circular planform.

6. The system of claim 5, wherein the far detection zone defines a generally annular planform having an inner radius of about 8 km (about 5 miles) and an outer radius of about 16 km (about 10 miles) and wherein the near detection zone defines a generally circular planform having a radius of about 1.6 km (about 1 mile).

7. The system of claim 3, wherein said artificially intelligent processing system determines the position of the detected unmanned aerial vehicle based on the radio signal broadcast by the unmanned aerial vehicle.

8. The system of claim 3, wherein said artificially intelligent processing system determines the position of the detected unmanned aerial vehicle based on data collected from a satellite-based position location system provided on the unmanned aerial vehicle.

9. The system of claim 3, wherein said countermeasures system develops the countermeasure based on the position of the detected unmanned aerial vehicle.

10. The system of claim 1, further comprising a database registry operatively associated with said control system, said database registry comprising identification data relating to registered unmanned aerial vehicles, and wherein said countermeasures system develops the countermeasure based on the identification data.

11. The system of claim 1, further comprising a display system operatively associated with said control system, said display system displaying information and data relating to the operation of said system for detecting an unmanned aerial vehicle.

12. The system of claim 1, further comprising a third party notification system operatively associated with said control system, said third party notification system sending a notice to a third party relating to the detected unmanned aerial vehicle.

13. The system of claim 1, wherein said sensor network detects a data frame periodically broadcast by the unmanned aerial vehicle.

14. The system of claim 13, wherein the data frame comprises at least one beacon frame comprising an address field.

15. The system of claim 14, wherein the address field comprises a media access control address.

16. The system of claim 1, further comprising a security vehicle operatively associated with said control system, said control system operating said security vehicle in accordance with a countermeasure developed by said countermeasures system.

17. The system of claim 16, wherein said security vehicle comprises an unmanned aerial vehicle.

18. An unmanned aerial vehicle defense system, comprising:
a sensor network, said sensor network comprising a plurality of radio transceivers, each of the radio transceivers being operable to detect and broadcast radio signals to detect an unmanned aerial vehicle, the plurality of radio transceivers being remote from the detected unmanned aerial vehicle; and
a control system operatively associated with said sensor network, said control system comprising:
an artificially intelligent processing system, said artificially intelligent processing system identifying the detected unmanned aerial vehicle based on a radio signal broadcast by the unmanned aerial vehicle and detected by said sensor network; and
a countermeasures system operatively associated with said artificially intelligent processing system, said countermeasures system developing a countermeasure based on the identity of the unmanned aerial vehicle, said artificially intelligent processing system operating said sensor network to transmit the developed countermeasure to the unmanned aerial vehicle to commandeer a host control system of the detected unmanned aerial vehicle, the unmanned aerial vehicle subsequently operating in accordance with the developed countermeasure without regard to a subsequent command issued by the host control system of the detected unmanned aerial vehicle.

19. A method of defending against an unmanned aerial vehicle, comprising:
monitoring a sensing area for the presence of the unmanned aerial vehicle;
remotely detecting a radio signal broadcast by the unmanned aerial vehicle;
identifying the unmanned aerial vehicle via an artificially intelligent processing system;
developing a countermeasure based on the identity of the unmanned aerial vehicle; and
transmitting the developed countermeasure to the unmanned aerial vehicle to commandeer a host control system of the detected unmanned aerial vehicle, the unmanned aerial vehicle subsequently operating in accordance with the developed countermeasure without regard to a subsequent command issued by the host control system of the detected unmanned aerial vehicle.

20. The method of claim 19, further comprising determining a position within the sensing area of the detected unmanned aerial vehicle and wherein said developing the countermeasure comprises developing a countermeasure based on the position of the detected unmanned aerial vehicle.

21. The method of claim 20, wherein determining the position of the unmanned aerial vehicle comprises determining the position of the unmanned aerial vehicle based on the radio signal broadcast by the unmanned aerial vehicle.

22. The method of claim 20, wherein determining the position of the unmanned aerial vehicle comprises determining the position of the unmanned aerial vehicle based on data collected from a satellite-based position location system provided on the unmanned aerial vehicle.

23. The method of claim 19, wherein said identifying the unmanned aerial vehicle comprises comparing information received from the unmanned aerial vehicle with a database registry comprising identification data relating to registered unmanned aerial vehicles.

24. The method of claim 19, further comprising displaying on a display system information and data relating to the unmanned aerial vehicle.

25. The method of claim 19, further comprising notifying a third party about the detected unmanned aerial vehicle.

26. The method of claim 19, wherein said identifying the unmanned aerial vehicle comprises analyzing a data frame periodically broadcast by the unmanned aerial vehicle.

27. The method of claim 26, wherein said analyzing a data frame comprises identifying at least one beacon frame periodically broadcast by the unmanned aerial vehicle.

28. The method of claim 27, wherein said identifying at least one beacon frame comprises identifying a media access control address of the unmanned aerial vehicle.

29. The method of claim 19, further comprising tracking a position of the detected unmanned aerial vehicle to determine whether the unmanned aerial vehicle is operating in accordance with the developed countermeasure.

30. The method of claim 29, further comprising developing a second countermeasure if the unmanned aerial vehicle is not operating in accordance with the first developed countermeasure.

31. The method of claim 19, wherein said developing a countermeasure further comprises deploying an unmanned aerial security vehicle to intercept the detected unmanned aerial vehicle.

32. The method of claim 31, wherein the countermeasure comprises one or more selected from the group consisting of commandeer, disable, and intercept.

33. A non-transitory computer-readable storage medium having computer-executable instructions embodied thereon that, when executed by at least one computer processor comprising an artificially intelligent processing system cause the processor to:

monitor a sensor network to detect the presence of an unmanned aerial vehicle, the sensor network including a plurality of radio transceivers, each of the radio transceivers being operable to remotely detect and broadcast radio signals from and to the unmanned aerial vehicle;

identify the unmanned aerial vehicle based on radio signals received from the unmanned aerial vehicle;

develop a countermeasure based on the identity of the unmanned aerial vehicle; and transmit the developed countermeasure to the unmanned aerial vehicle to commandeer a host control system of the detected unmanned aerial vehicle so that the unmanned aerial vehicle subsequently operates in accordance with the developed countermeasure without regard to a subsequent command issued by the host control system of the detected unmanned aerial vehicle.

34. The storage medium of claim 33, wherein said computer-readable instructions further comprise instructions that cause the computer processor to determine a position of the detected unmanned aerial vehicle and develop the countermeasure based on the position of the detected unmanned aerial vehicle.

35. The storage medium of claim 34, wherein said computer-readable instructions further comprise instructions that cause the computer processor to determine the position of the unmanned aerial vehicle based on the radio signal broadcast by the unmanned aerial vehicle.

36. The storage medium of claim 34, wherein said computer-readable instructions further comprise instructions that cause the computer processor to determine the position of the unmanned aerial vehicle based on data collected from a satellite-based position location system provided on the unmanned aerial vehicle.

37. The storage medium of claim 33, wherein said computer-readable instructions further comprise instructions that cause the computer processor to compare information received from the unmanned aerial vehicle with a database registry comprising identification data relating to registered unmanned aerial vehicles.

38. The storage medium of claim 33, wherein said computer-readable instructions further comprise instructions that cause the computer processor to display on a display system operatively associated with the computer processor information and data relating to the unmanned aerial vehicle.

* * * * *